United States Patent [19]
Lambert

[11] Patent Number: 5,016,628
[45] Date of Patent: May 21, 1991

[54] DISPOSABLE CARBON DIOXIDE ABSORBER

[75] Inventor: Barnum B. Lambert, San Jose, Calif.

[73] Assignee: Environmental Support Systems, Inc., San Jose, Calif.

[21] Appl. No.: 512,389

[22] Filed: Apr. 23, 1990

[51] Int. Cl.⁵ ............................................. A62B 23/02
[52] U.S. Cl. .......................... 128/205.28; 128/205.12; 128/205.27; 128/205.17
[58] Field of Search ...................... 128/205.12, 205.28, 128/205.27, 205.17

[56] References Cited

U.S. PATENT DOCUMENTS 1,229,050  6/1917  Donald ............................ 128/205.27
3,240,567  3/1966  Caparelli ........................ 128/205.28

FOREIGN PATENT DOCUMENTS 976768  12/1964  United Kingdom ........... 128/205.28

Primary Examiner—Edgar S. Burr
Assistant Examiner—Eric P. Raciti
Attorney, Agent, or Firm—Stuart P. Meyer

[57] ABSTRACT

A disposable $CO_2$ absorber for applications in rebreathing systems uses a flexible bag-like pouch to contain $CO_2$ absorbent granules. The pouch includes an intake port having a one-way valve at the top of the pouch and an outlet or exhaust port including a perforated cylindrical tube or perforated disk in the bottom of the pouch. Exhaled gas containing $CO_2$ passes through the one-way valve at the intake port and contacts the absorbent granules where a chemical reaction bonds the $CO_2$ with the granules. The residual gas, substantially free of $CO_2$, passes out of the pouch through the exhaust ports for rebreathing by the user. The flexure of the pouch increases the efficiency with which the $CO_2$ is absorbed.

7 Claims, 2 Drawing Sheets

DISPOSABLE CARBON DIOXIDE ABSORBER

BACKGROUND AND FIELD OF THE INVENTION

This invention relates generally to closed-circuit rebreathing apparatus using $CO_2$ absorbers.

In general, commonly used absorbers incorporate solid, non-flexible containers to hold the absorbent materials, which are usually granulated pellets. Conventional rebreathing apparatus includes rigid cylindrical cartridges for the containment of the absorbent granules. The manufacturing, tooling and shipping costs of rigid containers are relatively high.

In addition, rigid containers allow little movement of the absorbent granules. Free movement of granules inhibits agglomeration and allows the presentation of new absorbent surfaces to the gas as the granules change position.

Yet another deficiency of rigid containers in rebreathing apparatus is that temperature differentials on the smooth metal or plastic inner surface of such rigid containers often result in condensation forming on those surfaces. To the extent that the condensation drips on, or otherwise contacts, the granules, the absorptive capabilities of such granules are greatly decreased. Conventional devices use various techniques to minimize this deficiency, such as multiple flexible outer bags surrounding the rigid container, heat shields to localize the condensation and sponges to soak up whatever condensation forms. Such conventional devices are described in the literature (see, for example, U.S. Pat. Nos. 4,502,876 and 4,764,346).

A further deficiency of rigid containers in rebreathing apparatus is that a number of low-resistance flow paths may develop through such containers. One effect of such "tunneling" or blow-through is that the absorptive capabilities of granules adjacent to the low-resistance flow paths diminish much earlier than those of granules located elsewhere. A second effect of blow-through is that a significant volume of gas bypasses the granules completely, such that no absorption of this gas takes place.

SUMMARY OF THE INVENTION

In accordance with the present invention, a disposable, flexible $CO_2$-absorbent packet can be used in any application where it is effective to rebreathe the expired breath of humans or animals. In the preferred embodiment of the invention, the packet is manufactured with a round intake fitting having a one-way valve. The size of the packet determines the service life, so different applications will require the use of different-sized packets. A variety of exhaust port configurations may be used, as desired for a particular application. For instance, a perforated tube or disk may be used as the exhaust port.

The use of a flexible container allows each granule to move in relation to the other granules, thus exposing greater granule surface area to the gas. Since the granules move with flexure of the container, it is less likely that low-resistance flow paths will be maintained. This ensures a uniform resistance to gas flow through the device and reduces the likelihood of blow-through occurring as in conventional rigid containers.

The use of flexible material in the construction of the container also decreases condensation within the container that reduces the efficiency of the device. Thus, the need for conventional heat shields, multiple containers and sponges is eliminated.

Furthermore, the "bag-like" pouch implementation of the flexible container is less expensive to manufacture and ship than a conventional rigid container. The flexible container improves the absorbent effectiveness of each granule, thereby requiring fewer granules for the same service life and providing further savings in materials and cost.

By choosing a suitable transparent or translucent material for the flexible container, the condition of the granules can be observed. Under some conditions, granules may tend to adhere to each other or "clot," and such clotting when observed can be corrected by manually flexing the container to separate the granules.

DETAILED DESCRIPTION OF THE PREFERRED EMBODIMENT

Figure 1:
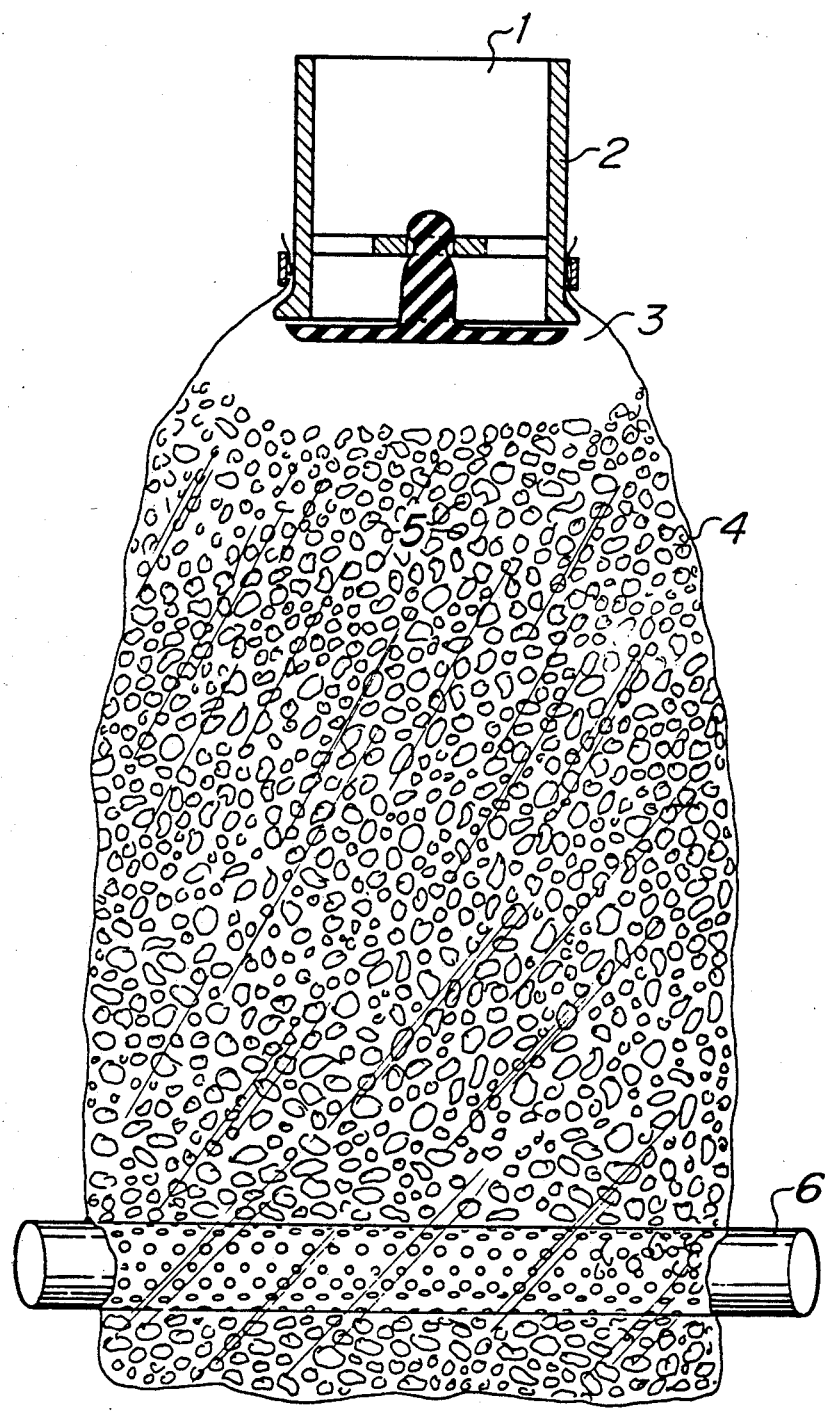
FIG. 1 is a cutaway view of one embodiment of the present invention that uses a perforated tube as the exhaust port.
Figure 2:
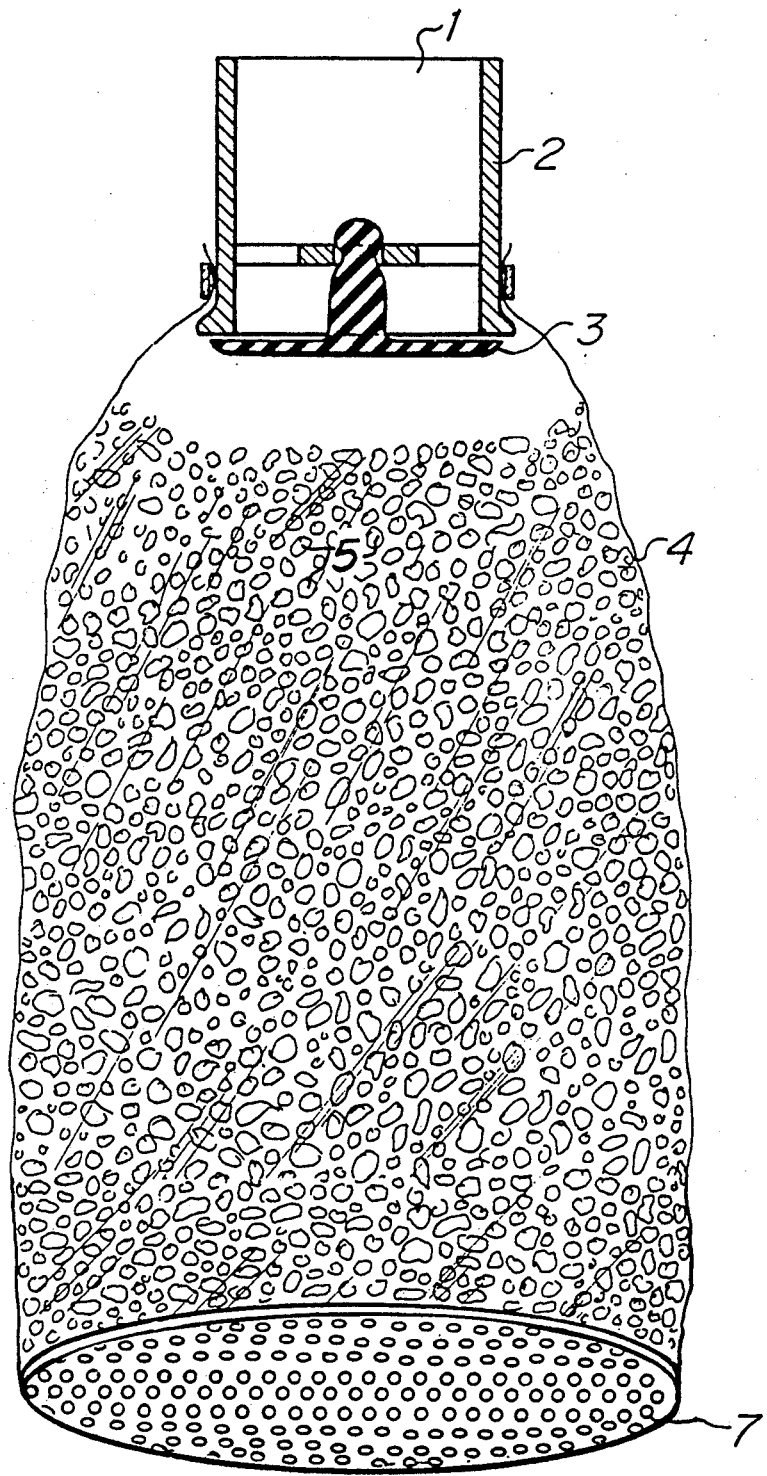
FIG. 2 is a cutaway view of another embodiment of the present invention that uses a perforated disk as the exhaust port.

Referring now to FIGS. 1 and 2, the preferred embodiment of this invention is a flexible packet 4 containing absorbent granules 5, of conventional SODASORB $CO_2$-absorbent material, with a cylindrical intake port 2 at the top of the packet 4 and an exhaust port of a cylindrical perforated tube 6 or perforated disk 7 at the bottom of the packet. The packet 4 may be used in any type of conventional outer housing (not shown), such as a box, cylinder, bag, or the like, that the user may choose for a specific application.

The intake port 2 is fitted with a one-way valve 3 so that gas in the space 1 defined by the intake port 2 may only enter the packet 4 when the pressure differential between the space 1 and the inside of the packet 4 is sufficiently large. In application, exhaled gas opens the valve 3, thus allowing the exhaled gas to enter the packet 4 through the intake port 2. Pressure differential from the intake port 2 to the exhaust tube 6 or disk 7 causes the gas to traverse the length of the packet 4, thereby contacting the granules 5. The $CO_2$ in the gas is absorbed via chemical reaction with the granules, and the residual gas exits the packet 4 through the exhaust tube 6 or disk 7 for rebreathing by the user.

Preferably, the packet 4 should be constructed of a flexible material that is translucent or transparent, to allow observation of the granules 5. In the preferred embodiment, a transparent film of such material as polyethylene is used. Depending on the particular application, it may also be advantageous to use a textured material on which condensation is not likely to form.

Therefore, the disposable carbon dioxide absorber of the present invention allows rebreathing of exhaled gas by passing such gas through a flexible canister containing absorptive granules.

What is claimed is:

1. Apparatus for rebreathing gas containing $CO_2$ comprising:
    granular means for absorbing $CO_2$; and
    a bag shaped packet made from a flexible film material flexible for containing the granular means, the container having an intake port for the gas to enter the container and an exhaust port for the gas to exit the container after the gas has flowed through the granular means.

2. Apparatus as in claim 1 further comprising:
a valve disposed substantially between the intake port and the exhaust port of the flexible container, the valve being responsive to gas pressure differentials to permit the gas containing $CO_2$ to flow only in the direction from the intake port to the exhaust port 3. Apparatus as in claim 1, wherein the flexible container is transparent.

4. Apparatus as in claim 1, wherein the exhaust port includes a perforated disk.

5. Apparatus as in claim 1, wherein the exhaust port includes a perforated tube.

6. Apparatus as in claim 2, wherein the valve is formed integrally with the intake port.

7. Apparatus as in claim 1, wherein the film material is polyethylene film.

* * * * *